United States Patent [19]
Mizoguchi et al.

[11] Patent Number: 4,657,142

[45] Date of Patent: Apr. 14, 1987

[54] EASY-TO-OPEN CARTON FOR CONFECTIONERY OR OTHER FOOD PRODUCTS INCLUDING A SKIVE UNDERLYING A TEARSTRIP END

[75] Inventors: Yoshihiko Mizoguchi, Tokyo; Keiichi Sekine, Shiki; Yasutoyo Komiya, Zama; Yoshio Nishida, Tokyo, all of Japan

[73] Assignees: Meiji Seika Kabushiki Kaisha; Dai Nippon Insatsu Kabushiki Kaisha, both of Japan

[21] Appl. No.: 756,272

[22] Filed: Jul. 18, 1985

[30] Foreign Application Priority Data

Jul. 26, 1984 [JP] Japan .......................... 59-112555[U]

[51] Int. Cl.⁴ ................................. B65D 5/54
[52] U.S. Cl. .................................. 206/606; 206/613; 229/1.5 B; 229/87 F; 426/122
[58] Field of Search ............... 206/610, 611, 612, 626, 206/628, 634, 605, 632, 613, 608, 615, 627, 629, 631, 633, 606; 229/87 F, 4.5, DIG. 5, 5.6, 17 R, 176, 1.5 B; 426/115, 122, 127, 123

[56] References Cited

U.S. PATENT DOCUMENTS

| | | | |
|---|---|---|---|
| 1,599,267 | 9/1926 | Amos | 206/606 |
| 1,672,884 | 6/1928 | Gingras | 206/627 X |
| 2,039,830 | 5/1936 | Owens | 206/606 |
| 2,099,412 | 11/1937 | Seidler | 206/627 X |
| 2,347,161 | 4/1944 | Watts et al. | 206/627 X |
| 2,811,455 | 10/1957 | Erekson | 206/606 X |
| 2,963,215 | 12/1960 | Saidel et al. | 229/87 F |
| 3,093,293 | 6/1963 | Freese | 206/606 |
| 3,100,597 | 8/1963 | Saidel et al. | 229/87 F |
| 3,100,598 | 8/1963 | Saidel et al. | 229/87 F |
| 3,242,829 | 3/1966 | White | 229/21 X |
| 3,304,185 | 2/1967 | Fortney | 426/122 |
| 3,391,617 | 7/1968 | Wise et al. | 229/1.5 B |
| 3,409,206 | 11/1968 | Slouka et al. | 206/606 |
| 3,487,443 | 12/1969 | Wise et al. | 229/1.5 B |
| 3,502,257 | 3/1970 | Virros | 206/606 |
| 3,566,752 | 3/1971 | Dreher | 206/606 X |
| 3,604,613 | 9/1971 | Haas et al. | 229/176 |
| 3,620,439 | 11/1971 | Morse | 206/627 |
| 3,727,750 | 4/1973 | Petter | 206/612 X |
| 3,773,248 | 11/1973 | Cecil et al. | 206/606 |

FOREIGN PATENT DOCUMENTS 2032393 5/1980 United Kingdom ......... 229/DIG. 5

Primary Examiner—William Price
Assistant Examiner—Bryon Gehman
Attorney, Agent, or Firm—Parkhurst & Oliff

[57] ABSTRACT

A carton is formed by rolling a sectorial piece of sheet material, preferably a lamination of at least paper and a plastic that is impervious to fluid, into the shape of a flattened cone. The lapping side edges and apex end of the cone are both sealed, whereas its base end is to be closed and sealed after placing a desired food product into the carton therethrough. The overlapping edge of the sealed side seam has a tab protruding therefrom, which tab is to be pulled for opening the carton by tearing same along a loop of tear-off strip around the cone. The cone is flattened along a pair of opposite indented lines preformed in the sheet material so as to extend between the apex end and base end of the cone. Each indented line is bifurcated at a midportion thereof into a pair of spaced apart branch lines to impart thickness to the carton.

14 Claims, 25 Drawing Figures

4,657,142

EASY-TO-OPEN CARTON FOR CONFECTIONERY OR OTHER FOOD PRODUCTS INCLUDING A SKIVE UNDERLYING A TEARSTRIP END

BACKGROUND OF THE INVENTION

This invention belongs to the broad realm of food packaging and pertains more specifically to a sealed or sealable carton suitable for packaging food products, particularly confectionery such as candy, cake, pastry, crepe, cookie, biscuit, etc.

Of the variety of packages heretofore suggested and used by the confectionery industry for products that require air- and water-tight packaging, perhaps the most common has been those of the composite type. The product has first been filled in a bag or inner liner of aluminum foil or plastic film, which has then been introduced into a more rigid, protective carton. This dual packaging is objectionable because of the complex packaging-line operations and higher per unit package costs. From the standpoint of consumer convenience, the composite package requires a dual opening operation. The advent of a noncomposite, easy-to-open, sealable package has long been awaited by confectioners.

SUMMARY OF THE INVENTION

The present invention overcomes the difficulties heretofore encountered with the composite packaging of confectionery or other food products and provides a novel carton of inexpensive construction that can fluid-tightly package a desired commodity without any overwrap or underwrap. The novel carton in accordance with the invention is also notable for its capability of mass production at reduced cost, mechanical strength, aesthetically favorable appearance, and ease with which it can be opened.

The invention may be briefly summarized as a carton approximately in the shape of a flattened cone formed by rolling a substantially sectorial piece of sheet material. The carton has a lapping side seam and an apex end, which are both sealed, and a base end which is to be sealed after placing a desired commodity into the carton therethrough. The sheet material is adapted to provide around the cone a loop of tear-off strip which is to be removed by tearing for opening the carton. For the removal of this tear-off strip, the overlapping edge of the side seam has a tab protruding therefrom as an extension of the tear-off strip. The cone is flattened along a pair of opposite linear indentations or depressions preformed in the sheet material and extending between its apex end and base end. Each linear indentation is bifurcated at its midportion into a pair of spaced apart branches to impart sufficient thickness to the carton for accommodating the desired product.

Thus, all that the consumer has to do to open the carton is to pull the tab around the same for removing the tear-off strip, which preferably is located intermediate the apex end and base end of the carton. The removal of the looped tear-off strip results, therefore, in the separation of the carton into two parts. One of these parts, including the base end, may then be removed to partly expose the food product received in the other part including the apex end. The base end part may be used for recapping as necessary.

Preferably, the sheet material of which the carton is made is a lamination of paper and one or more plies of plastic, metal or like material that is impervious to fluids. The use of such laminated sheet materials makes possible the moistureproof packaging of food products without the possibility of the degradation of their essential qualities for an extended period of time. The loop of tear-off strip around the carton is well calculated so as not to impair its fluid tightness, as will be more fully disclosed in the preferred embodiments to be presented below.

According to a further feature of the invention, the laminated sheet material includes a ply of an oriented plastic, which is oriented in the same direction as that in which the tear-off strip extends. The tear-off strip will then be completely removed by pulling the tab, without the likelihood of tapering off before complete removal.

For the ease of fabrication of the carton from the sectorial piece of sheet material, the innermost ply of the lamination may be a film of a heat-sealable substance. The side seam, apex end and base end of the carton may then be easily sealed under heat and pressure.

The invention also features provisions for preventing the tab from being fused or otherwise sticking to the underlapping edge of the side seam to such a degree that the tab may break off upon application of a pulling force thereto. The carton will become unopenable upon breakage of the tab, so that any excessive sticking of the tab, as well as the neighboring part of the overlapping edge, to the underlapping edge must be avoided. The side seam itself, however, must be positively sealed against leakage. This invention meets these contradictory requirements by the provision of simple and thoroughly practicable means.

The above and other features and advantages of this invention and the manner of realizing them will become more apparent, and the invention itself will best be understood, from a study of the following description and appended claims, with reference to the attached drawings showing the preferred embodiments of the invention.

DESCRIPTION OF THE PREFERRED EMBODIMENTS

Figure 1:
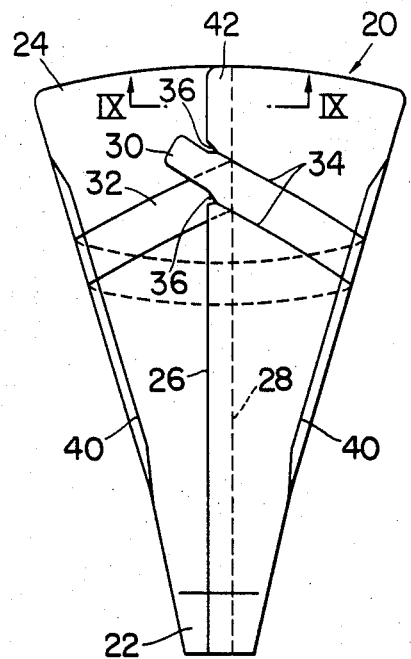
FIG. 1 is an elevation of the carton embodying the principles of the present invention.
Figure 2:
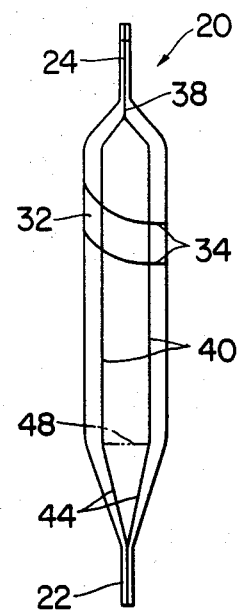
FIG. 2 is a right hand side elevation of the carton of FIG. 1.

The present invention is believed to be best embodied in the carton illustrated in FIGS. 1 and 2 of the above drawings and therein generally designated 20. It will be seen from these figures that the carton 20 is approximately in the shape of a somewhat flattened cone, having an apex end 22 at the bottom and a base end 24 at the top. The apex end 22 is fluid tightly sealed, as under heat and pressure, whereas the base end 24 is to be so sealed after placing therethrough a desired food product, such as crepe, into the carton 20.

Figure 3:
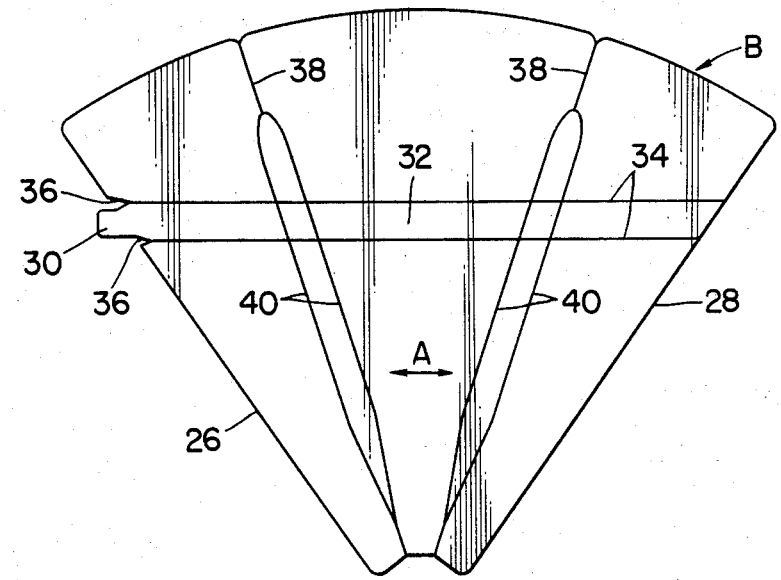
FIG. 3 is a plan of a blank from which the carton of FIGS. 1 and 2 is fabricated.

The carton 20 is fabricated from a blank B shown in FIG. 3. The carton blank B is an approximately sectorial piece of sheet material which preferably is a lamination of paper and one or more other substances that are impervious to fluids, as will be later explained in more detail. The carton blank B has a pair of opposite side edges 26 and 28 extending at an angle to each other. The left hand side edge 26, as seen in this figure, has a tab 30 protruding therefrom to a relatively short extent as an extension of a tear-off strip 32 extending transversely and rectilinearly between the two side edges 26 and 28. The tear-off strip 32 is defined by a pair of linear incisions 34 extending in parallel spaced relation to each other. As the name implies, the tear-off strip 32 is intended to be torn off for opening the carton 20 by holding the tab 30 between the fingers. The width of the tear-off strip 32, that is, the spacing between the pair of incisions 34, may be approximately one centimeter. The side edge 26 has a pair of notches 36 formed therein on both sides of the tab 30 for the ready tearing of the tear-off strip 32 upon application of a pulling force to the tab. The incisions 34 bounding the tear-off strip 32 will be more fully described below.

In the completed carton 20 of FIGS. 1 and 2, the tear-off strip 32 forms a loop around the cone. It will also be seen that the tear-off strip 32 is located intermediate the base end 22 and apex end 24, somewhat closer to the base end than to the apex end. Upon removal of this tear-off strip, therefore, the carton 20 will separate into a lower part including the apex end 22 and an upper part including the base end 24.

The carton blank B has also formed therein a pair of angularly spaced apart, linear indentations or depressions 38 which are arranged radially approximately about the same axis as the pair of opposite side edges 26 and 28 of the blank. Each indentation 38 is bifurcated at its midportion into a pair of branches 40 extending in parallel spaced relation to each other.

For the fabrication of the carton 20, the blank B is rolled so as to create a lap joint with the side edges 26 and 28, with the tabbed edge 26 lapping over the other edge 28. The edge 26 will thus be hereinafter referred to as the overlapping edge, and the other edge 28 as the underlapping edge. The lapping edges 26 and 28 are then sealed, also, as for example, under heat and pressure, to form a lapping side seam labeled 42 in FIG. 1. The apex end 22 is likewise sealed. Then, as the base end 24 is sealed after placing a desired commodity therethrough as aforesaid, there can be completed a hermetically sealed package in the approximate shape of a flattened cone.

For sealing the base end 24 of the carton 20, which end is significantly larger than the apex end 22, the carton may be flattened along the pair of linear indentations 38. The bifurcations 40 at the midportions of these indentations serve to impart a certain degree of thickness to the carton 20, suitable for accommodating crepe or like food product.

It will be observed from FIG. 2 that the pair of parallel branches 40 of each linear indentation 38 converge toward each other, as indicated at 44, as they extend toward the apex end 22 of the carton 20. Consequently, as will be best understood from an inspection of FIG. 4, the opposite side edges of the carton 20 are bent at the junctions between the parallel and convergent indentations 40 and 44. The reference numeral 46 in FIG. 4 denotes the thus defined apex end portion of the carton 20, lying below the noted bends in the side edges of the carton. The angle $\theta 1$ between each side edge of this apex end portion 46 and the axis X—X of the carton 20 is appreciably less than the angle $\theta 2$ between each side edge of the other portion of the carton and the axis X—X. The bends in the side edges of the carton 20 can be made more pronounced by providing a transverse indentation, as indicated by the dashed line in FIG. 2 and designated 48, at the junction between each pair of parallel branch indentations 40 and the neighboring pair of convergent branch indentations 44.

Figure 4:
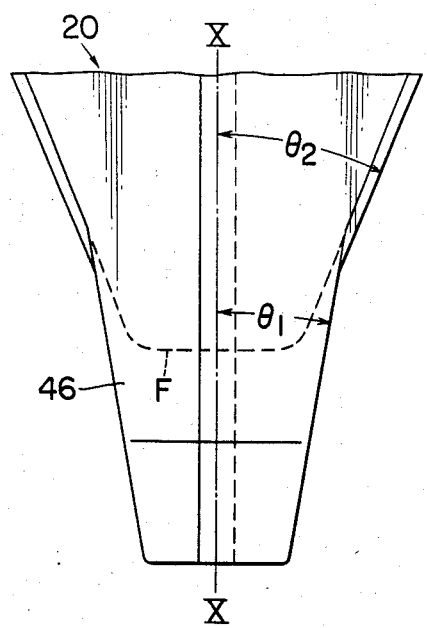
FIG. 4 is an enlarged, fragmentary elevation showing a lower part of the carton of FIGS. 1 and 2.

The relatively slender apex end portion 46 of the carton 20 created as above serves to provide therein a space left unoccupied by the food product F indicated by the dashed line in FIG. 4. The lower end portion of the food product F is thus prevented from going out of shape, as during filling or during shipment or other handling of the carton. There is an additional advantage gained by the slender apex end portion 46. In placing crepe or like food product into the carton, it is customary to add an alcohol to inhibit mold growth. The unoccupied space within the apex end portion 46 of the carton serves to receive and temporarily hold the charge of the alcohol and hence to avoid undue impregnation of an end portion of the food product with the liquid.

Figure 5:
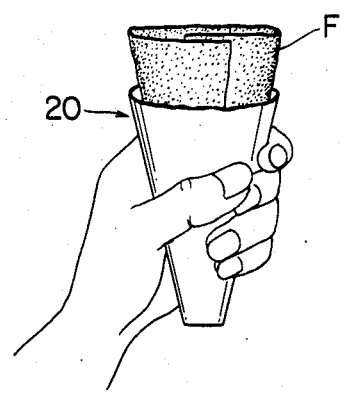
FIG. 5 is a perspective view showing the carton of FIGS. 1 and 2 after having been opened to expose the packaged food product.

The purchaser of the commodity packaged with the carton 20 of this invention may open the carton by holding the tab 30 between his fingers and pulling the same along the pair of linear incisions 34 all around the carton. The tear-off strip 32 will thus be removed by tearing along the incisions 34, with the consequent division of the carton into two parts. Then the purchaser may remove the upper part of the carton to partly expose the packaged food product F as pictured in FIG. 5. The food product F, herein shown as a crepe folded into triangular shape, can be eaten by grasping the lower part of the carton. As desired, the removed upper part of the carton may be used as a cap if it becomes necessary to reclose the carton.

Figure 6:
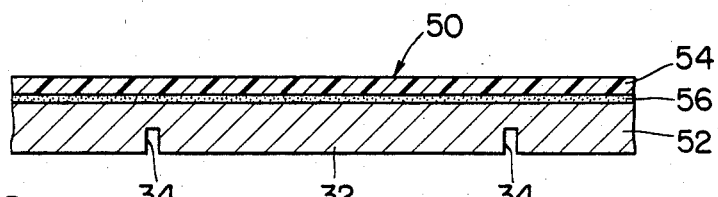
FIG. 6 is an enlarged, fragmentary cross-section through an example of laminated sheet material from which the carton of FIGS. 1 and 2 can be made.
Figure 7:
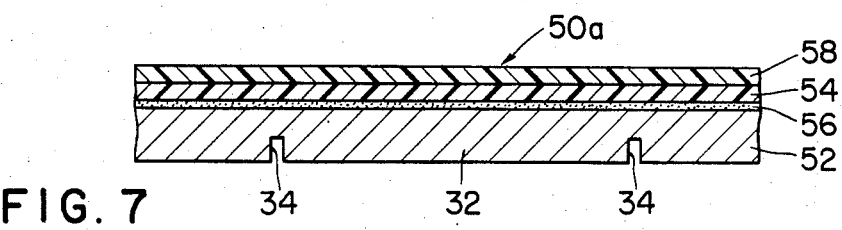
FIG. 7 is a view similar to FIG. 6 but showing an alternative form of laminated sheet material suitable for the fabrication of the carton.
Figure 8:
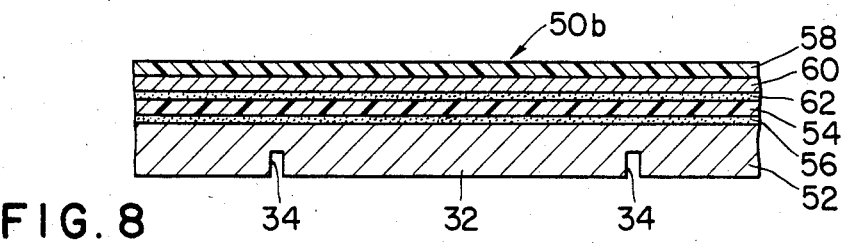
FIG. 8 is also a view similar to FIG. 6 but showing another alternative form of laminated sheet material suitable for the fabrication of the carton.

FIGS. 6, 7 and 8 are greatly enlarged, sectional representations of three different examples of laminated sheet materials suitable for use in the fabrication of the carton 20 in accordance with the invention. The three examples of sheet materials are designated 50, 50a and 50b, respectively.

The example 50 of FIG. 6 represents the basic form of sheet material. It has a paper layer 52 and a plastic film 54, with a layer 56 of an adhesive in between for bonding together the paper layer and the plastic film. The paper layer 52 forms the outer ply of the carton.

The sheet material 50a of FIG. 7 further includes a ply 58 of a heat-sealable substance overlying the plastic film 54. This plastic film is bonded to the outer paper 52 via the adhesive layer 56.

The sheet material 50b of FIG. 8 additionally includes a ply 60 of a substance impervious to gas, which ply is bonded to the plastic film 54 via an adhesive layer 62. The heat-sealable ply 58 overlies the gastight ply 60. The paper ply 52 constitutes the outermost ply of the carton, as with the two preceding sheet materials 50 and 50a, and the heat-sealable ply 58 forms the innermost ply of the carton.

Whatever the specific configuration of the laminated sheet material in use, it is recommended that the plastic film 54 be molecularly oriented in one direction. The direction of this molecular orientation should agree with the direction in which the tear-off strip 32 extends rectilinearly on the unfolded carton blank B as in FIG. 3. The arrow A in FIG. 3 indicates the orientation of the plastic film 54. The use of such an oriented plastic film will make it materially easier to remove the tear-off strip 32 by pulling the tab 30. The oriented plastic may be a thermoplastic synthetic resin film that has been stretched in one direction, or which has been stretched to a greater extent in one direction than in another. Preferred examples of materials for the plastic film 54 are such thermoplastic polymers of the polyolefin group as polyethylene and polypropylene. The films of such thermoplastic polymers may be stretched, as above, for the provision of oriented plastic films.

The innermost heat-sealable layer 58 in the laminated sheet materials 50a and 50b of FIGS. 7 and 8 can be fabricated from such synthetic resins as polyethylene, polypropyrene, and polystyrene. The gastight layer 60 of the sheet material 50b of FIG. 8 can be either an aluminum foil or a film of polyvinylidene chloride, of polyester or polypropylene coated with polyvinylidene, of ethylenevinyl alcohol copolymer, etc. The adhesive layers 56 and 62 of the sheet materials 50, 50a and 50b can be such thermoplastics as polyethylene and polypropylene in nonoriented form.

The paper for use as the base ply 52 of the sheet material 50, 50a or 50b may also be directional; that is, it may tear more easily in one direction than in the other directions. Such directional paper may of course be bonded to the oriented plastic film 54 with the "directionality" of the paper in agreement with that of the oriented plastic film.

Desirably, in the fabrication of the carton 20 of FIGS. 1 and 2, the apex end 22, base end 24 and lapping side seam 42 should be heat sealed for ease of manufacture. The sheet materials 50a and 50b of FIGS. 7 and 8 are therefore preferable to the sheet material 50 of FIG. 6 because of the provision of the innermost heat-sealable layer 58. The FIG. 8 sheet material 50b is particularly recommended to afford full protection of the commodity to be packaged. A practical example of sheet material for the fabrication of the carton 20, configured in accordance with the teachings of FIG. 8, comprises the following plies, given in order from the outside inwardly:

1. Paper (230 grams per square meter).
2. Polyethylene (adhesive, 15 microns thick).
3. Oriented polyethylene (20 microns thick).
4. Polyethylene (15 microns thick).
5. Aluminum foil (gas barrier, seven microns thick).
6. Polyethylene (heat-sealable layer, 60 microns thick).

FIGS. 6, 7 and 8 also reveal the pair of linear incisions 34 formed in the sheet material to bound the tear-off strip 32. It will be observed from these figures that the incisions 34 are formed in the paper layer 52, cut from its outer surface to a depth approximately from $\frac{1}{3}$ to $\frac{1}{2}$ the thickness of the paper layer. The incisions may of course be cut to the full thickness of the paper layer 52 without adversely affecting the fluid tightness of the carton 20. But the tear-off strip 32 can be removed without difficulties if the paper layer 25 is incised to the above specified depths. Such incomplete incisions are also desirable as they do not appreciably impair the mechanical strength of the carton. The linear incisions 34 may be cut at the same time when the blank B of FIG. 3 is stamped out from the sheet material 50, 50a or 50b after printing desired markings thereon.

An obvious alternative to the incisions 34 is the perforation of the paper layer 52. The perforations may be formed in the paper before its lamination with the other plies of the sheet material 50, 50a or 50b.

As will be seen by referring back to FIG. 1, the carton 20 of this invention has the side seam 42 formed by the lapping edges 26 and 28. Accordingly, if the underlapping edge 28 were not folded outwardly before being sealed to the overlapping edge 26, the paper layer 52 of the sheet material 50, 50a or 50b would be exposed to the interior of the carton through the underlapping edge. A simple folding, however, of the underlapping edge 28 would make the side seam 42 of the carton 20 three times as thick as the sheet material of which the carton is made. The creation of a side seam of such undue thickness can be avoided by means set forth hereinafter with reference to FIG. 9.

Figure 9:
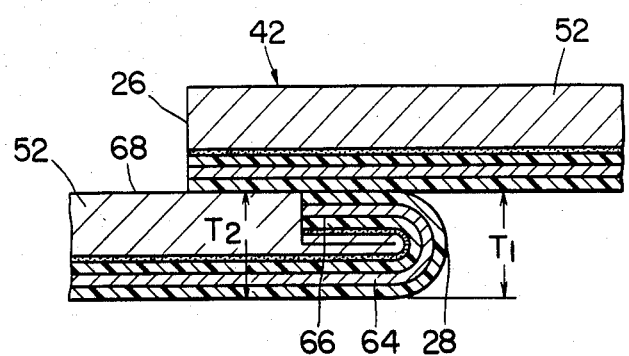
FIG. 9 is an enlarged, fragmentary cross-section through the carton of FIGS. 1 and 2, taken along the line IX—IX in FIG. 1 and showing in particular the lapping side seam of the carton.

For forming the lapping side seam 42 as cross-sectionally represented in FIG. 9, the side edge 28 of the carton blank B, FIG. 3, may have its outer paper layer 52 partly pared off to provide a skive 64 of an approximately constant thickness and constant width extending throughout the edge 28. This skive may then be doubled outwardly to provide a fold 66 approximately flush with the unskived part 68 of the sheet material. The two plies of the skive 64 should be bonded together. The thus pretreated side edge 28 of the carton blank B may then be sealed to the other side edge 26 in an underlapping relation thereto to provide the lapping side seam 42 of FIG. 9.

It will thus be seen that no part of the paper layer 52 of the sheet material is exposed to the interior of the carton 20 at its lapping side seam 42. This objective can of course be accomplished if the fold 66 of the skive 64 is exactly flush with the unskived part 68 of the sheet material, that is, if the paper layer 52 of the sheet material is skived to a depth exactly one half the thickness of the sheet material. However, since some fluctuations in the thickness of sheet materials for use for the fabrication of cartons in accordance with the invention are unavoidable, it is recommended that the paper layer 52 of each carton blank be skived only to such a depth that the thickness T1 of the folded skive 64 becomes greater than the thickness T2 of the sheet material.

Figure 10:
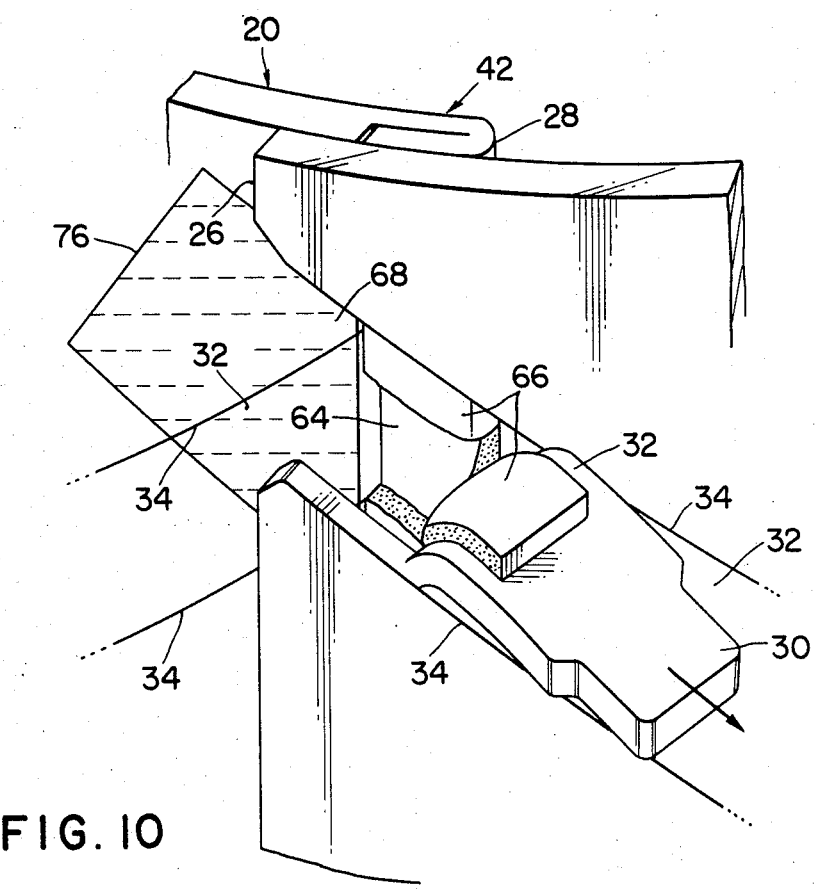
FIG. 10 is an enlarged, fragmentary perspective view of the carton of FIGS. 1 and 2, showing in particular how the tear-off strip of the carton is torn off its lapping side seam upon application of a pulling force to the tab.

Reference is now directed to FIG. 10 in order to explain how the tear-off strip 32 is torn off upon application of a pulling force to the tab 30. It will be noted that the fold 66 of the skive 64 remains bonded to the tab 30 as the latter is pulled in the arrow marked direction in which the tear-off strip 32 extends. That part of the skive fold 66 which is bonded to the tab 30 is torn and broken off the rest of the skive 64 as the tab is pulled further in the arrow marked direction. The tear-off strip 32 will thereafter tear easily along the pair of incisions 34. Only a minimal initial force is thus required for the removal of the tear-off strip 32 as a fraction of the skive fold 66 must be torn off with the tab 30.

However, should the tab 30 be bonded not only to the skive fold 66 but also to the unskived part 68 of the underlapping edge 28, a much greater initial force would be required. Worse yet, the tab 30 might break off the overlapping edge 26, making impossible the removal of the tear-off strip 32. As will be seen by referring again to FIGS. 7 and 8, the sheet materials 50a and 50b illustrated therein have the innermost layer 58 of heat-sealable material for thermally fusing together the lapping side edges 26 and 28. In fabricating the carton 20 with use of these sheet materials, the tab 30 would be fused to the unskived part 68 of the underlapping edge 28 at the time of the sealing of the lapping side edges 26 and 28 unless some measure were taken to prevent this.

Figure 11A:
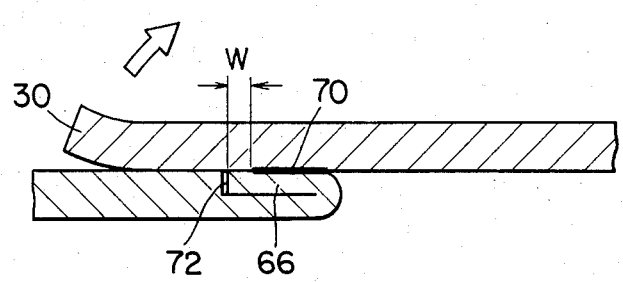
FIGS. 11A and 11B are enlarged, fragmentary cross-sections through the lapping side seam of the carton, which are both explanatory of a problem encountered with the removal of the tear-off strip of the carton.
Figure 11B:
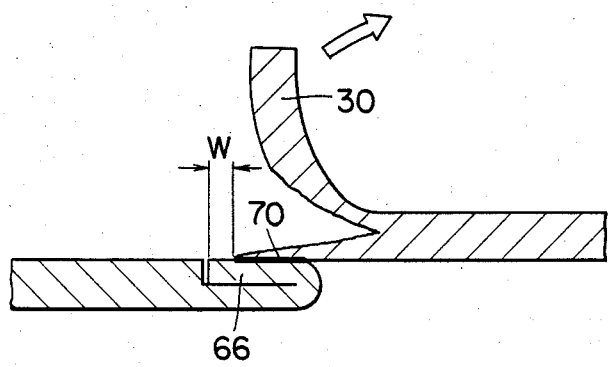

The sheet material 50 of FIG. 6 has no heat-sealable layer. The fabrication of the carbon 20 from this sheet material requires the use of an adhesive for bonding together the lapping side edges 26 and 28. It may be contemplated to bond the tab 30 only to the skive fold 66, in order that the tab may be torn only with a fraction of the skive fold attached thereto as in FIG. 10. The bonding of the tab 30 only to the skive fold 66 is difficult, however. The tab will break off if bonded also to the unskived part 68 of the underlapping edge 28 to the slightest degree. This might be avoided if the tab 30 were bonded to that part of the skive fold 66 which is indicated by the thickened line 70 in FIG. 11A, leaving an unbonded part of the width W along the edge 72 of the skive fold 66 in order to allow for some fluctuations in the bonded area 70. On being pulled in the arrow marked direction, however, the tab 30 might again break off as illustrated in FIG. 11B. This is because the force required for lifting the skive fold 66 is greater than the force under which the tab 30 breaks.

Figure 12:
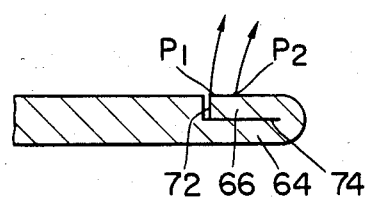
FIG. 12 is an enlarged, fragmentary cross-section through the underlapping edge of the side seam of the carton, the view being also explanatory of a problem encountered with the removal of the tear-off strip of the carton.

FIG. 12 is explanatory of forces to be exerted on the skive fold 66 when the tab is pulled to open the carton 20. The point P1 in this figure denotes the extreme edge 72 of the skive fold 66, and the point P2 denotes the left hand extremity, as seen in this figure, of the bonded area 70 of FIGS. 11A and 11B. It will be apparent that the skive fold 66, bonded at 74 to the other ply of the skive 64, can be torn and broken off more easily if a force in the direction of the arrows in FIG. 12 is exerted thereon at the point P1 rather than at the point P2. In other words, the unbonded area of the width W in FIGS. 11A and 11B should be zero for the easy, unfailing opening of the carton 20.

Figure 13:
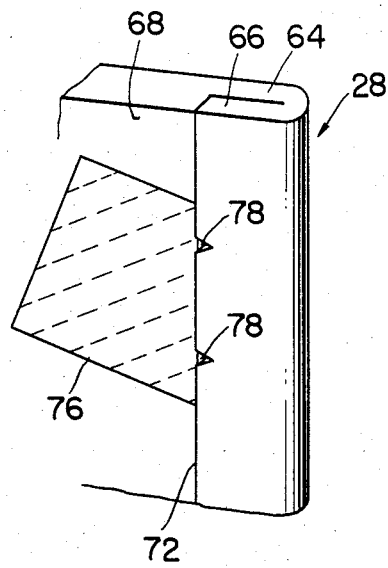
FIG. 13 is an enlarged, fragmentary perspective view of the underlapping edge portion of the carton, showing in particular a release region formed thereon to prevent the undue sticking of the tab and neighboring part of the overlapping edge to the underlapping edge.
Figure 14:
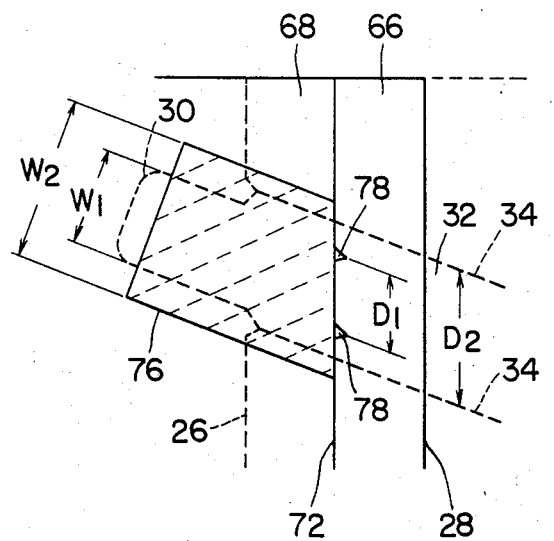
FIG. 14 is a diagrammatic, fragmentary elevation of the underlapping edge portion of the carton, shown together with a phantom outline of the overlapping edge portion to clearly reveal the positional relationship between the release region on the underlapping edge and the tab on the overlapping edge.

From the foregoing considerations the present invention suggests the provision of a layer of a release agent, such as a release ink, on a limited region of the unskived part 68 of the underlapping edge portion of the side seam 42, as indicated by the hatching designated 76 in FIGS. 13 and 14. This region 76 of the release agent (hereinafter referred to as the release region) is formed on that portion of the outer surface of the unskived part 68 of the underlapping edge 28 which immediately adjoins the fold 66 of the skive 64 and which underlies the tab 30 protruding from the overlapping edge 26. The width W2 of the release region 76 (i.e. the dimension in a direction at right angles with the tab 30) should be made greater than the width W1 of the tab in consideration of the possible relative misplacement of the lapping edges 26 and 28. It will also be observed from FIGS. 13 and 14 that the fold 66 of the skive 64 has a pair of spaced apart notches 78 in its edge 72 to expedite its tearing. The spacing D1 between these notches 78 should be made less than the dimension D2 of the tear-off strip 32 for the same reason as above.

Figure 15A:
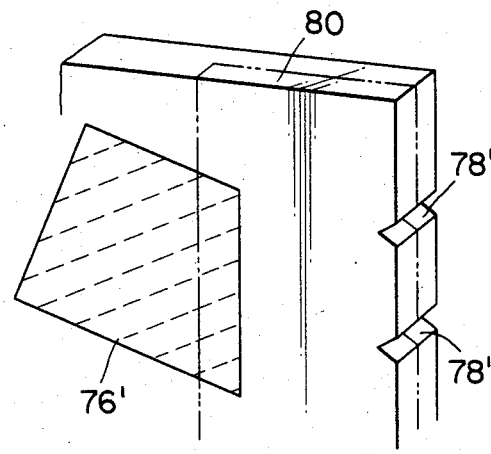
FIGS. 15A and 15B are fragmentary perspective views explanatory of the sequential steps for fabrication of the release region of FIGS. 13 and 14.
Figure 15B:
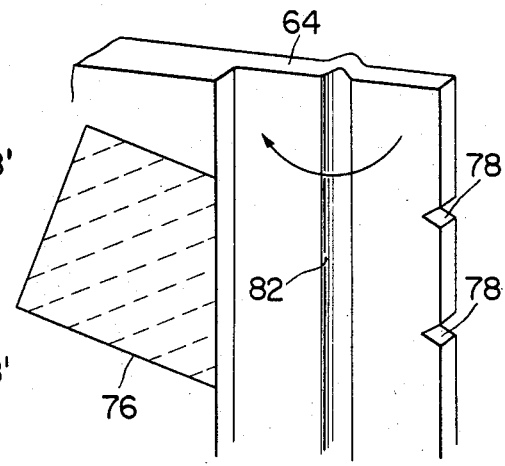

As has been previously set forth in connection with FIGS. 11A, 11B and 12, the release region 76 should be located infinitely close to the edge 72 of the skive fold 66. FIGS. 15A and 15B are explanatory of how the release region 76 can be so formed on the unskived part 68 of the underlapping edge 28. Before the underlapping edge 28 is pared off, a release ink may be pattern-printed on a required region 76', as illustrated in FIG. 15A. This region 76' must extend onto a part 80 to be pared off. The desired release region 76 can be formed as the part 80 is subsequently cut off, as in FIG. 15B. The skive 64 thus obtained may then be creased at 82, pasted, and folded over itself along the crease 82, as indicated by the arrow in FIG. 15B. The notches 78 in the edge 72 of the skive fold 66 may also be formed, as shown at 78' in FIG. 15A, before the part 80 is pared off. These notches 78 are not essential, however. The required part of the skive fold 66 will be torn off without the notches 78.

Figure 16A:
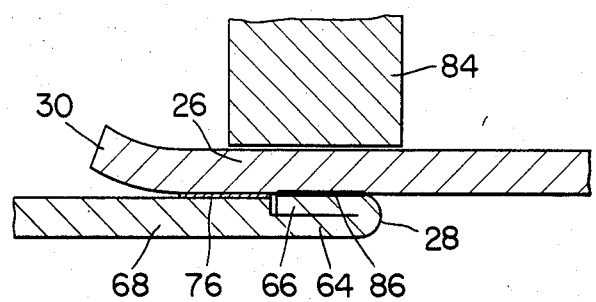
FIGS. 16A through 16D are a series of fragmentary cross sectional views explanatory of the sequential steps for sealing the lapping side seam of the carton and for subsequently opening the carton by pulling the tab over the sealed side seam.

FIG. 16A shows the lapping edges 26 and 28 being fused together by a heat sealer 84. Although the heat sealer 84 presses the tab 30 of the overlapping edge 26 down against the unskived part 68 of the underlapping edge 28, the release region 76 on this unskived part prevents the adhesion of the tab, as well as the neighboring part, of the overlapping edge 26 thereto. Thus, at least at the tab 30 and its neighboring part, the overlapping edge 26 is fused only to the fold 66 of the skive 64, as indicated by the thick line designated 86, regardless of the possible lateral displacement of the heat sealer 84 with respect to the lapping edges 26 and 28. The unbonded area of the width W, FIG. 11A, can thus be reduced to zero.

Figure 16B:
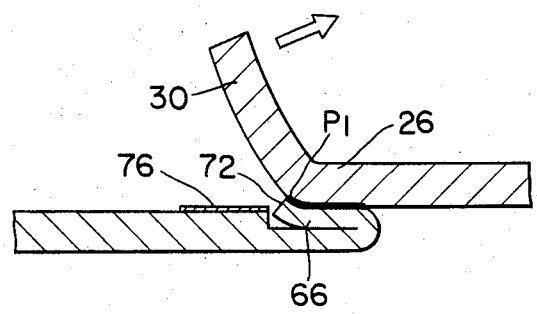

FIG. 16B shows the tab 30 pulled to open the thus fabricated carton. The pulling force applied to the tab 30 in the arrow marked direction is transmitted to the skive fold 66 mostly at its extreme edge 72. As has been discussed in conjunction with FIG. 12, the application of the force to the skive fold 66 at the point P1 on its extreme edge 72 makes it possible to tear and and lift the predetermined part of the skive fold without the possibility of the tab 30 breaking off the overlapping edge 26.

Figure 16C:
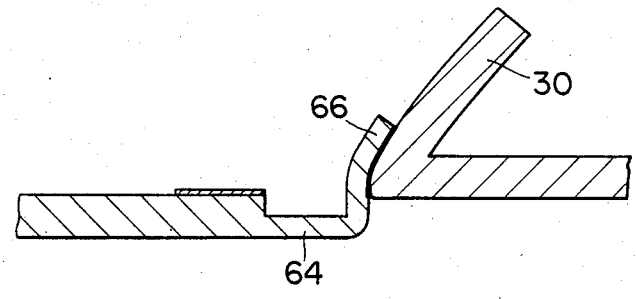
Figure 16D:
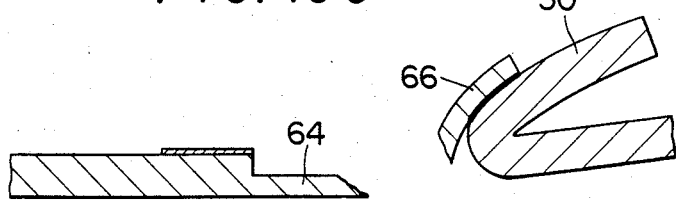

With the continued application of the pulling force to the tab 30, the required part of the skive fold 66 can be torn off, as in FIGS. 16C and 16D, at the crease 82, FIG. 15B, which has been formed in the skive 64 for folding it. The creased part of the skive 64 is of course weaker than the other parts thereof. Reference may be had back to FIG. 10 for the illustration in perspective of the tab 30 with the torn part of the skive fold 66 attached thereto.

Figure 17:
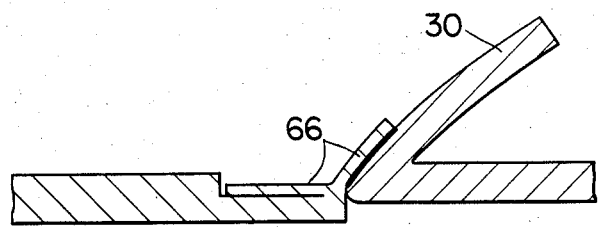
FIG. 17 is a view similar to FIGS. 16A through 16D but explanatory of an alternative way in which the carton is opened by pulling the tab over the sealed side seam.

In the use of laminated sheet materials such as those shown at 50, 50a and 50b in FIGS. 6, 7 and 8, one of the plies may be rendered readily separable from the next one. Then, as illustrated in FIG. 17, the required part of the skive fold 66 will be torn off between such plies with the application of less force to tab 30 than that required for tearing off the complete skive fold.

Figure 18:
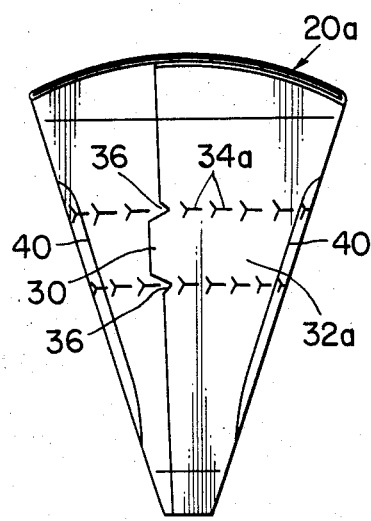
FIG. 18 is an elevation of an alternative form of the carton in accordance with the invention.
Figure 19:
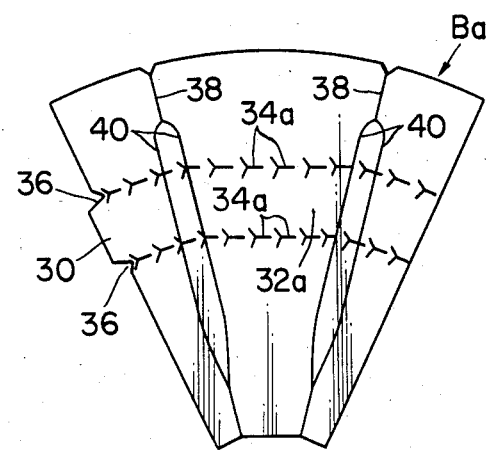
FIG. 19 is a plan of a blank from which the carton of FIG. 18 is made.

FIG. 18 shows a slightly modified carton 20a in accordance with the invention, which is fabricated from a carton blank Ba of FIG. 19. The modified carton 20a differs from the carton 20 in having a tear-off strip 32a defined by two series of discrete Y-shaped incisions 34a cut in its outer paper layer. The two series of incisions 34a extend in parallel spaced relation to each other and, when the blank Ba is unfolded as in FIG. 19, in an arcuate arrangement approximately about the apex of the sector-shaped blank. The other structural details of this carton 20a, such as the tab 30 with the pair of notches 36 on both sides thereof, and the pair of linear indentations 38 each having a pair of bifurcated lines 40 in its midportion, are as set forth above in connection with the carton 20.

Figure 20:
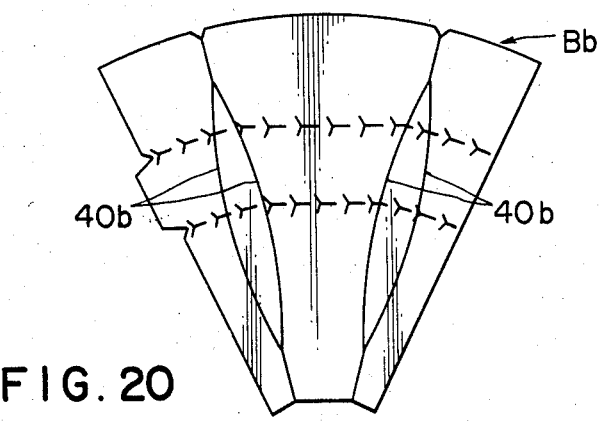
FIG. 20 is a plan of another alternative carton blank in accordance with the invention.

Another modified carton blank Bb of FIG. 20 features a pair of bifurcated lines 40b of each linear indentation 38 which are not parallel to each other as in the foregoing embodiments but which are convexed away from each other. The carton blank Bb is identical in the other structural details with the blank Ba of FIG. 19. The required carton in the approximate shape of a flattened cone can be fabricated from this carton blank Bb as well.

Notwithstanding the foregoing detailed disclosure, it is understood that the present invention is not to be limited by the specific embodiments given herein, as a variety of modifications or alterations of such embodiments will readily occur to one skilled in the art without departing from the scope of the invention. For example, in the use of laminated sheet materials such as those shown in FIGS. 6, 7 and 8, an additional ply of polyethylene or like substance may be formed on the outside of the paper layer in order to make the carton still more fluid tight. Further, in the cartons fabricated from such laminated sheet materials including a ply of an oriented plastic, it is the directionality of the oriented plastic, rather than the incisions 34 or 34a, that determines the course along which the tear-off strip 32 or 32a is removed. The incisions 34 or 34a may therefore be omitted in the manufacture of cartons from sheet materials containing a ply of an oriented plastic, although in this case the paper layer of the cartons may tear in an unsightly way.

What is claimed is:

1. An easy-to-open carton, particularly well suited for packaging confectionery or like food products, approximately in the shape of a flattened cone formed by rolling a substantially sectorial piece of sheet material, comprising: a lapping side seam and an apex end, which are both sealed, and a base end which is sealable after placing a desired product into the carton therethrough, the sheet material having around the cone a loop of tear-off strip which is removable by tearing for opening the carton, the side seam of the cone including an overlapping edge having a tab protruding therefrom as an extension of the tear-off strip for use in removing same, said side seam also having an underlapping edge with its outer side pared to provide a skive of a constant thickness and a constant width extending along the underlapping edge, the skive being doubled outwardly to provide a fold approximately flush with an unskived part of the sheet material, that portion of the outer surface of the unskived part of the sheet material which immediately adjoins the fold of the skive and which underlies the tab protruding from the overlapping edge of the side seam having formed thereon a layer of a release agent, whereby the tab is prevented from sticking to the cone despite the sealing of the side seam, said fold of the skive having a pair of spaced apart notches formed in its edge in the area under the tear-off strip to facilitate the tearing of the fold upon application of a puling force to the tab.

2. The carton of claim 1 wherein the loop of tear-off strip is located intermediate the apex end and base end of the carton, so that the carton separates into a part including the apex end and another part including the base end upon removal of the tear-off strip.

3. The carton of claim 1 wherein the sheet material is a lamination of paper and a film or foil of a substance that is impervious to fluids, with the paper forming an outer ply of the carton.

4. The carton of claim 3 wherein the tear-off strip is bounded by a pair of parallel spaced incisions formed in the paper of the sheet material.

5. The carton of claim 4 wherein the incisions are made in the outside surface of the paper to a depth less than the thickness of the paper.

6. The carton of claim 3 wherein the tear-off strip extends rectilinearly when the piece of sheet material is unrolled, and wherein the substance is a plastic that is oriented in the same direction as that in which the tear-off strip extends.

7. The carton of claim 6 wherein the sheet material further comprises a ply of a heat-sealable substance overlying the ply of the oriented plastic, whereby the lapping side seam, apex end, and base end of the carton can be heat sealed with the ply of the heat-sealable substance.

8. The carton of claim 7 wherein the sheet material further comprises a ply of a substance impervious to gas which is interposed between the ply of the oriented plastic and the ply of the heat-sealable substance.

9. A carton as claimed in claim 1 wherein the carton has a pair of opposite indented lines along which the cone is flattened and which are preformed in the sheet material so as to extend between the apex end and base end of the cone, each indented line being bifurcated at a midportion thereof into a pair of spaced apart branch lines to impart thickness to the carton.

10. The carton of claim 9 wherein the bifurcations of the pair of indented lines are adapted to make the angles between the pair of opposite sides of an apex end portion of the carton and the axis of the carton smaller than the angles between the pair of opposite sides of another portion of the carton and the axis of the carton.

11. The carton of claim 9 wherein each pair of branch lines are, in intermediate parts thereof, in parallel spaced relation to each other.

12. The carton of claim 9 wherein each pair of branch lines are convexed away from each other.

13. The carton of claim 1 wherein the dimension of the release agent layer in a direction at right angles with the tab is greater than the width of the tab.

14. The carton of claim 1 wherein the spacing between the pair of notches in the edge of the fold of the skive is less than the width of the tear-off strip.

* * * * *